United States Patent
Lin et al.

(10) Patent No.: US 8,390,254 B2
(45) Date of Patent: Mar. 5, 2013

(54) CHARGING APPARATUS FOR LAPTOP COMPUTER WITH MULTI-BATTERIES AND METHOD FOR THE SAME

(75) Inventors: Yeh-Shen Lin, San-Chung (TW); Yi-Feng Tung, San-Chung (TW); Ku-Ching Lu, San-Chung (TW); Yun-Chin Lin, San-Chung (TW)

(73) Assignee: Winmate Communication Inc., New Taipei (TW)

( * ) Notice: Subject to any disclaimer, the term of this patent is extended or adjusted under 35 U.S.C. 154(b) by 402 days.

(21) Appl. No.: 12/750,824

(22) Filed: Mar. 31, 2010

(65) Prior Publication Data

US 2011/0241620 A1 Oct. 6, 2011

(51) Int. Cl.
*H02J 7/00* (2006.01)
*H02J 9/00* (2006.01)

(52) U.S. Cl. .......... 320/112; 320/124; 320/128; 307/43; 307/66

(58) Field of Classification Search ............... 320/112
See application file for complete search history.

(56) References Cited

U.S. PATENT DOCUMENTS

| | | | |
|---|---|---|---|
| 5,302,858 A * | 4/1994 | Folts | 307/66 |
| 2008/0106234 A1* | 5/2008 | Yun | 320/124 |
| 2009/0072788 A1* | 3/2009 | Delaille et al. | 320/124 |
| 2010/0134305 A1* | 6/2010 | Lu et al. | 340/636.13 |

* cited by examiner

*Primary Examiner* — Edward Tso
*Assistant Examiner* — Johali Torres Ruis
(74) *Attorney, Agent, or Firm* — Chun-Ming Shih; HDLS IPR Services

(57) ABSTRACT

A charging apparatus for laptop computer with multiple-batteries is used in a first battery unit and a second battery unit. The charging apparatus comprises a micro controller unit; a first charging switch unit electrically connected to the micro controller unit; a second charging switch unit electrically connected to the micro controller unit; and a charging unit electrically connected to the first charging switch unit and the second charging switch unit. The micro controller unit controls the charging unit charging the first battery unit and the second battery unit via controlling the first charging switch unit and the second charging switch unit. The charging apparatus charges multi-batteries simultaneously.

5 Claims, 6 Drawing Sheets

US 8,390,254 B2

CHARGING APPARATUS FOR LAPTOP COMPUTER WITH MULTI-BATTERIES AND METHOD FOR THE SAME

BACKGROUND OF THE INVENTION

1. Field of the Invention

The invention generally relates to an apparatus and a method for charging multi-battery, in particular to an apparatus and a method for charging multi-batteries in a laptop computer.

2. Description of Prior Art

Laptop computers are gradually replacing desktop computers due to its mobile advantages. It has become an indispensable purchase item among technology gadget fans.

The prior art laptop computer has a major battery charging problem, which a battery can only be charged one at a time. Alternatively, the ability to charge multi-battery simultaneously can be offered by specific charging IC (smart IC), which are expensive and complicated.

SUMMARY OF THE INVENTION

In order to address the above problem, an objective of the present invention is to provide a charging apparatus for charging a plurality of batteries in a laptop computer simultaneously.

In order to address the above problem, the other objective of the present invention is to provide a charging method for charging a plurality of batteries in a laptop computer simultaneously.

In order to achieve the above objective of the present invention, the charging apparatus is used for a first battery unit and a second battery unit. The charging apparatus comprises a micro controller unit; a first charging switch unit electrically connected to the micro controller unit; a second charging switch unit electrically connected to the micro controller unit; and a charging unit electrically connected to the first charging switch unit and the second charging switch unit. The micro controller unit controls the charging unit charging the first battery unit and the second battery unit via controlling the first charging switch unit and the second charging switch unit.

In order to achieve the above other objective of the present invention, the charging method of the present invention is used for a first battery unit and a second battery unit. The charging method comprises: charging the first battery unit until the battery capacity of the first battery unit equals to the battery capacity of the second battery unit when battery capacity of the first battery unit is less than battery capacity of the second battery unit; and charging simultaneously to the first battery unit and the second battery unit when the battery capacity of the first battery unit equals to the battery capacity of the second battery unit.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
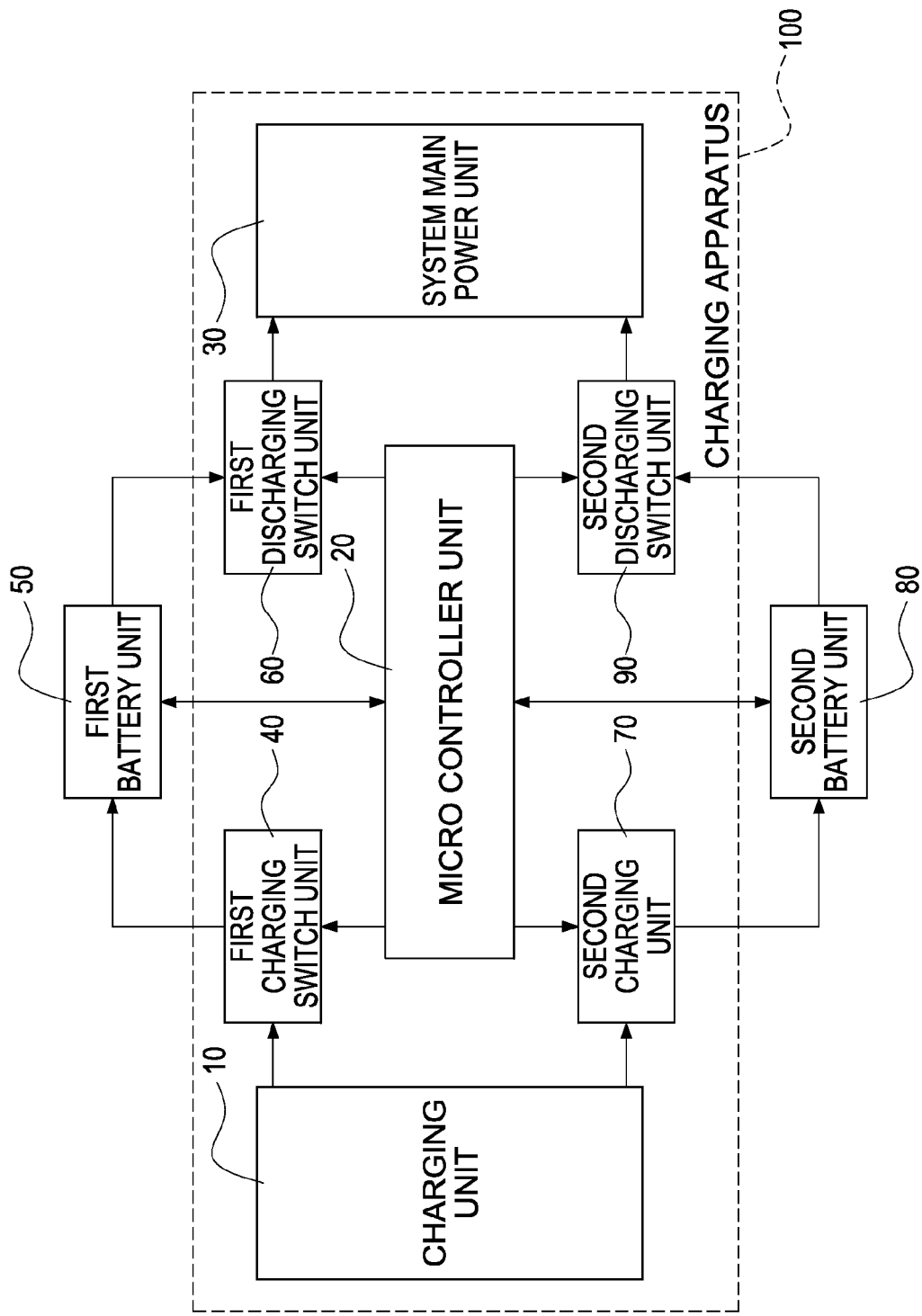
FIG. 1 is a block diagram of a charging apparatus according to the present invention.

FIG. 1 is a block diagram of a charging apparatus according to the present invention. The charging apparatus 100 of the present invention is used in a first battery unit 50 and a second battery unit 80. The charging apparatus 100 comprises a micro controller unit 20, a first charging switch unit 40 electrically connected to the micro controller unit 20, a second charging switch unit 70 electrically connected to the micro controller unit 20, a charging unit 10 electrically connected to the first charging switch unit 40 and the second charging switch unit 70, a first discharging switch unit 60 electrically connected to the micro controller unit 20, a second discharging switch unit 90 electrically connected to the micro controller unit 20, and a system main power unit 30 electrically connected to the first discharging switch unit 60 and the second discharging switch unit 90.

The micro controller unit 20 controls the charging unit 10 charging the first battery unit 50 and the second battery unit 80 via controlling the first charging switch unit 40 and the second charging switch unit 70; and the micro controller unit 20 controls the first battery unit 50 and the second battery unit 80 to discharge to the system main power unit 30 via controlling the first discharging switch unit 60 and the second discharging switch unit 90 so as to power the laptop computer.

Figure 2:
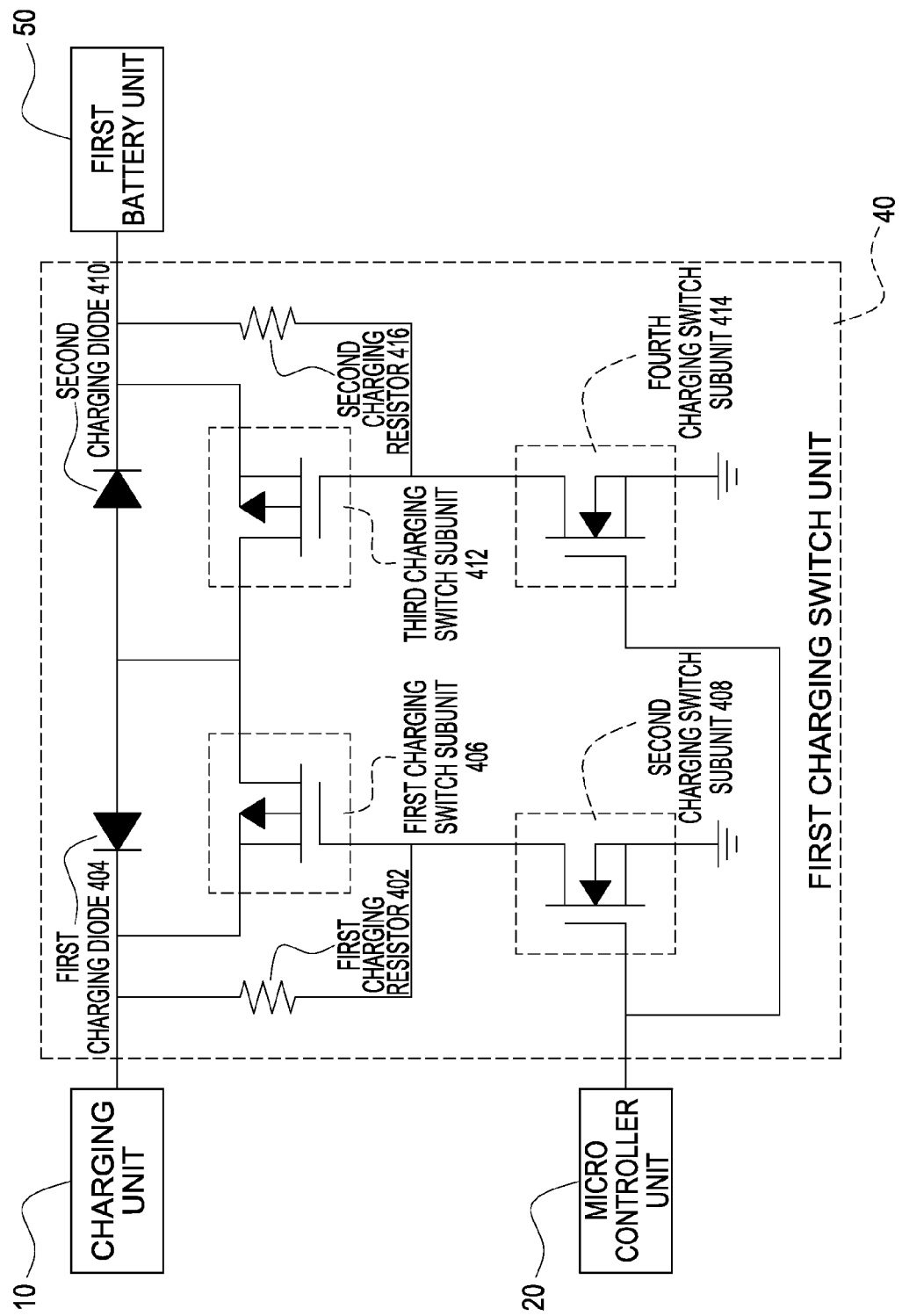
FIG. 2 is a block diagram of the first charging switch unit according to the present invention.

FIG. 2 is a block diagram of the first charging switch unit according to the present invention. The first charging switch unit 40 further comprises a first charging switch subunit 406 electrically connected to the charging unit 10, a second charging switch subunit 408 electrically connected to the first charging switch subunit 406 and the micro controller unit 20, a third charging switch subunit 412 electrically connected to the first charging switch subunit 406 and the first battery unit 50, a fourth charging switch subunit 414 electrically connected to the third charging switch subunit 412 and the micro controller unit 20, a first charging diode 404 electrically connected to the first charging switch subunit 406, a second charging diode 410 electrically connected to the third charging switch subunit 412, a first charging resistor 402 electrically connected to the first charging switch subunit 406, and a second charging resistor 416 electrically connected to the third charging switch subunit 412.

Figure 3:
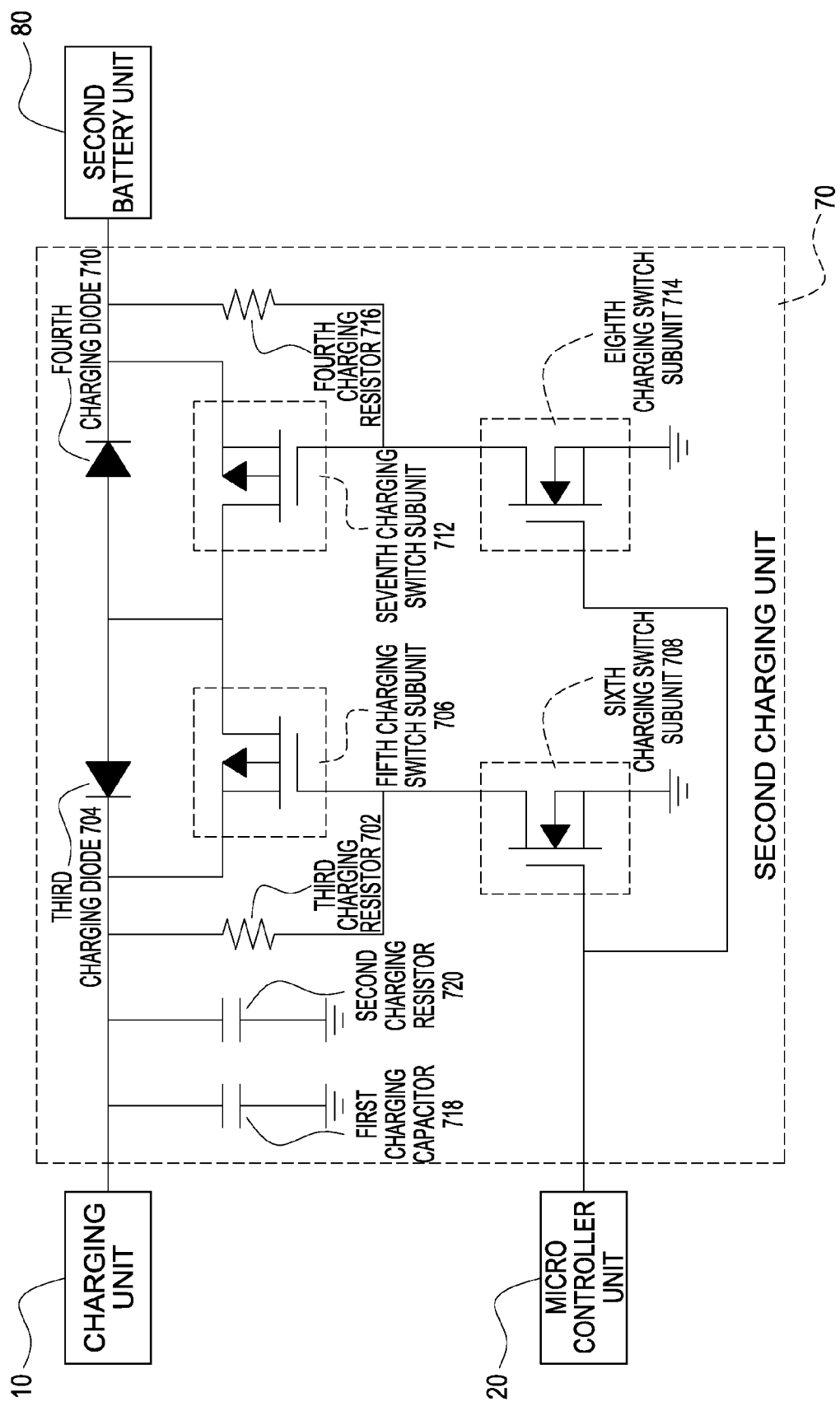
FIG. 3 is a block diagram of the second charging switch unit according to the present invention.

FIG. 3 is a block diagram of the second charging switch unit according to the present invention. The second charging switch unit 70 further comprises a fifth charging switch subunit 706 electrically connected to the charging unit 10, a sixth charging switch subunit 708 electrically connected to the fifth charging switch subunit 706 and the micro controller unit 20, a seventh charging switch subunit 712 electrically connected to the fifth charging switch subunit 706 and the second battery unit 80, and a eighth charging switch subunit 714 electrically connected to the seventh charging switch subunit 712 and the micro controller unit 20, a third charging diode 704 electrically connected to the fifth charging switch subunit 706, a fourth charging diode 710 electrically connected to the seventh charging switch subunit 712, a third charging resistor 704 electrically connected to the fifth charging switch subunit 706, a fourth charging resistor 716 electrically connected to the seventh charging switch subunit 712, a first charging capacitor 718 electrically connected to the fifth charging switch subunit 706, and a second charging capacitor 720 electrically connected to the fifth charging switch subunit 706.

Figure 4:
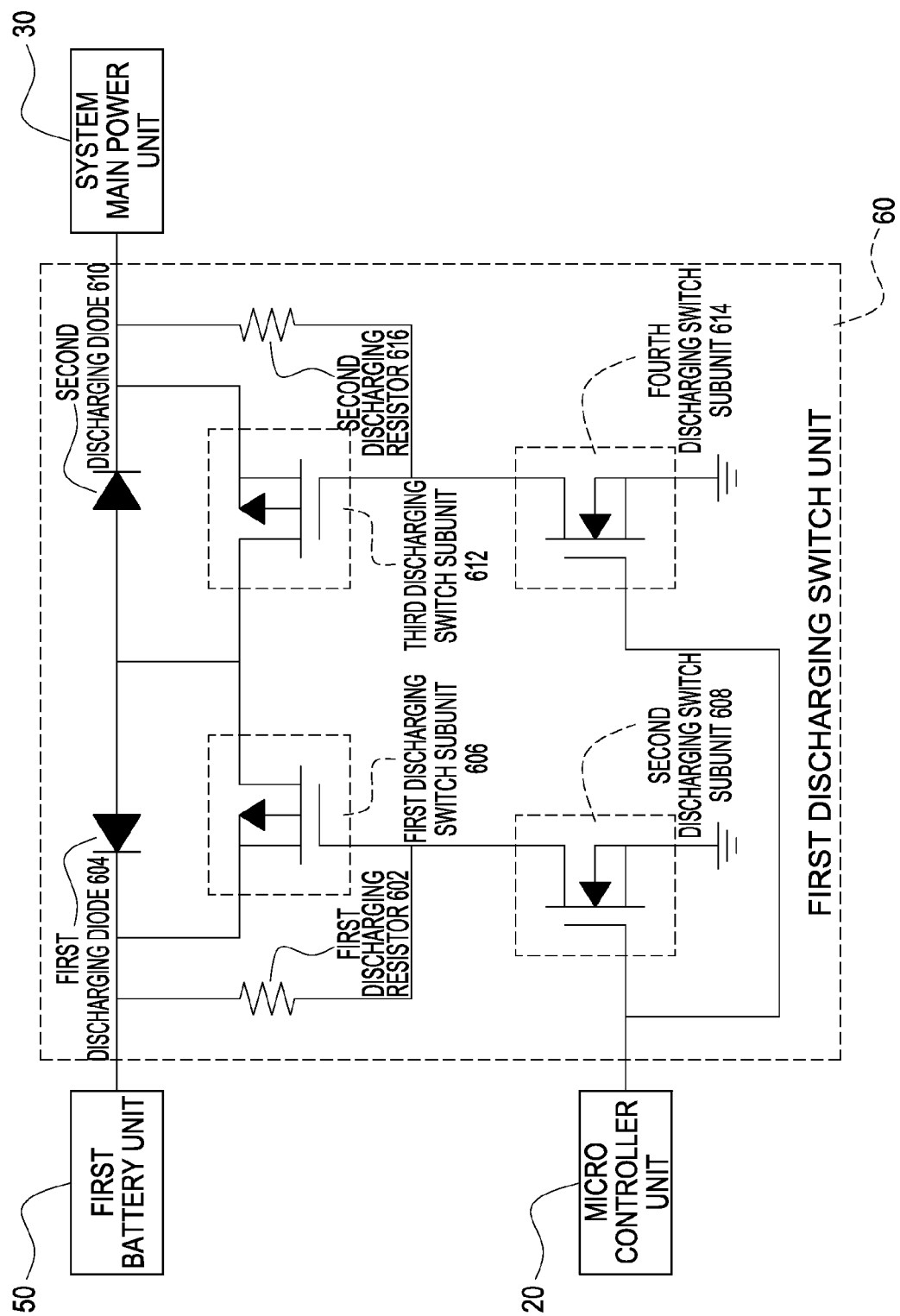
FIG. 4 is a block diagram of the first discharging switch unit according to the present invention.

FIG. 4 is a block diagram of the first discharging switch unit according to the present invention. The first discharging switch unit 60 further comprises a first discharging switch subunit 606 electrically connected to the first battery unit 50, a second discharging switch subunit 608 electrically connected to the first discharging switch subunit 606 and the micro controller unit 20, a third discharging switch subunit 612 electrically connected to the first discharging switch subunit 606 and the system main power unit 30, a fourth discharging switch subunit 614 electrically connected to the third discharging switch subunit 612 and the micro controller unit 20, a first discharging diode 604 electrically connected to the first discharging switch subunit 606, a second discharging diode 610 electrically connected to the third discharging switch subunit 612, a first discharging resistor 602 electrically connected to the first discharging switch subunit 606, and a second discharging resistor 616 electrically connected to the third discharging switch subunit 612.

Figure 5:
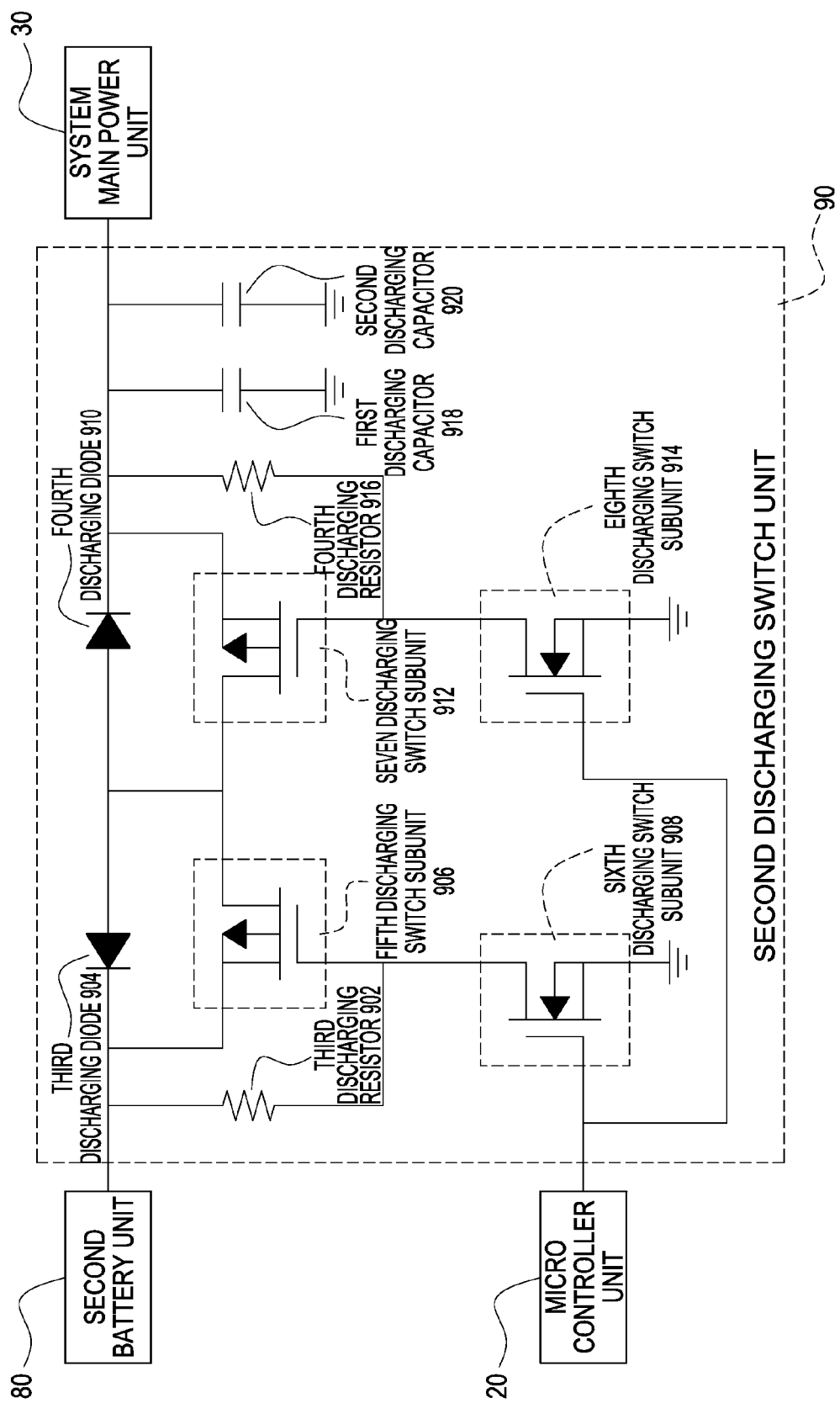
FIG. 5 is a block diagram of the second discharging switch unit according to the present invention.

FIG. 5 is a block diagram of the second discharging switch unit according to the present invention. The second discharging switch unit 90 further comprises a fifth discharging switch subunit 906 electrically connected to the second battery unit 80, a sixth discharging switch subunit 908 electrically connected to the fifth discharging switch subunit 906 and the micro controller unit 20, a seventh discharging switch subunit 912 electrically connected to the fifth discharging switch subunit 906 and the system main power unit 30, a eighth discharging switch subunit 914 electrically connected to the seventh discharging switch subunit 912 and the micro controller unit 20, a third discharging diode 904 electrically connected to the fifth discharging switch subunit 906, a fourth discharging diode 910 electrically connected to the seventh discharging switch subunit 912, a third discharging resistor 902 electrically connected to the fifth discharging switch subunit 906, a fourth discharging resistor 916 electrically connected to the seventh discharging switch subunit 912, a first discharging capacitor 918 electrically connected to the seventh discharging switch subunit 912, and a second discharging capacitor 920 electrically connected to the seventh discharging switch subunit 912.

The first charging switch subunit 406, the third charging switch subunit 412, the fifth charging switch subunit 706, the seventh charging switch subunit 712, the first discharging switch subunit 606, the third discharging switch subunit 612, the fifth discharging switch subunit 906, the seventh discharging switch subunit 912 are P-TYPE Metal Oxide Semiconductor Field Effect Transistors (MOSFETs), the second charging switch subunit 408, the fourth charging switch subunit 414, the sixth charging switch subunit 708, the eighth charging switch subunit 714, the second discharging switch subunit 608, the fourth discharging switch subunit 614, the sixth discharging switch subunit 908, the eighth discharging switch subunit 914 are N-TYPE MOSFETs.

Refer to FIG. 2, the micro controller unit 20 sends a voltage signal with voltage higher than the threshold voltage of the second charging switch subunit 408 and the fourth charging switch subunit 414 (for example a signal of 3.3V which is higher than the threshold voltage signal of 2.0V) to turn on the second charging switch subunit 408 and the fourth charging switch subunit 414. The gate voltage of the first charging switch subunit 406 and the third charging switch subunit 412 is 0V which is higher than the threshold voltage for example −2.0V. Thus the first charging switch subunit 406 and the third charging switch subunit 412 are turned on and the charging unit 10 is triggered to charge the first battery unit 50. The operations occurred to the charging switch unit in FIG. 3 is identical to FIG. 2 and the details are referenced to the above description about the charging switch unit in FIG. 2.

Refer to FIG. 4, the micro controller unit 20 sends a sends a voltage signal with voltage higher than the threshold voltage of the second discharging switch subunit 608 and the fourth discharging switch subunit 614 (for example a signal of 3.3V which is higher than the threshold voltage signal of 2.0V) to turn on the second discharging switch subunit 608 and the fourth discharging switch subunit 614. The gate voltage of the first discharging switch subunit 606 and the third discharging switch subunit 612 is 0V which is higher than the threshold voltage for example −2.0V. Thus the first discharging switch subunit 606 and the third discharging switch subunit 612 are turned on and the first battery unit 50 is triggered to be discharged to the system main power unit 30. The operations occurred to the discharging switch unit in FIG. 5 is identical to FIG. 4 and the details are referenced to the above description about the charging switch unit in FIG. 4.

Figure 6:
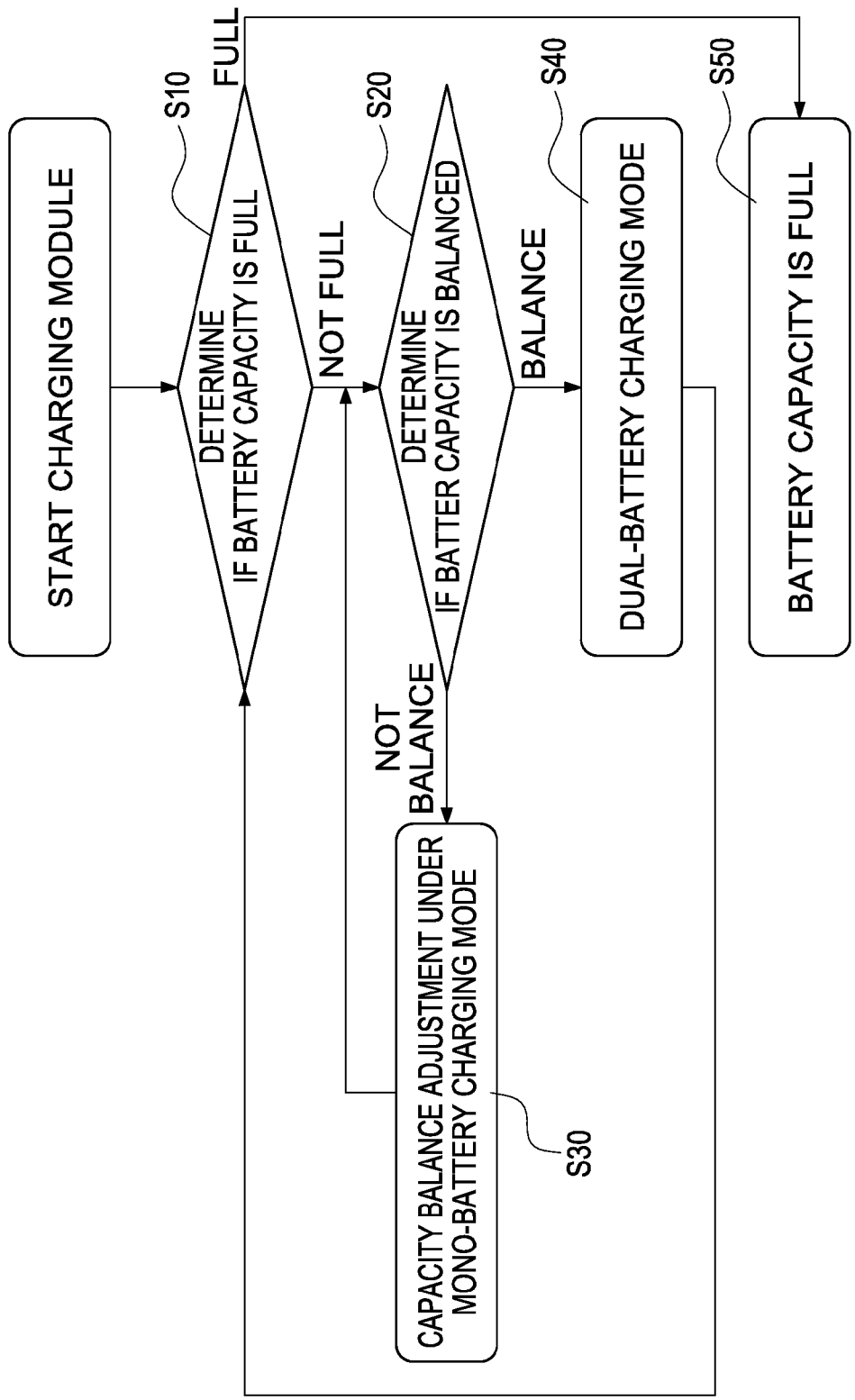
FIG. 6 is the flow chart of a charging method according to the present invention.

FIG. 6 is a flow chart of the charging method according to the present invention. Also ref to FIG. 1, firstly the micro controller unit 20 determines if the battery capacity of the first battery unit 50 or the second battery unit 80 is full (S10). If the battery capacity is full then the flow is completed (S250); if the battery capacity is not full and the battery is required to be charged, then determines if the battery capacity of the first battery unit 50 equals to the battery capacity of the second battery unit 80 (S20). If not equal, then the micro controller unit 20 controls the charging unit 10 to charge the batter unit of less battery capacity until the battery capacity of the mentioned two battery units are the same via controlling the first charging switch unit 40 and the second charging switch unit 70 (S30). For example, when the battery capacity of the first battery unit 50 is less than the battery capacity of the second battery unit 80, the micro controller unit 20 controls the charging unit 10 charging the first battery unit 50 until the battery capacity of the first battery unit 50 equals to the battery capacity of the second battery unit 80 via controlling the first charging switch unit 40 and the second charging switch unit 70. Lastly, when the battery capacity of the first battery unit 50 equals to the battery capacity of the second battery unit 80, the micro controller unit 20 controls the charging unit 10 charging the first battery unit 50 and the second battery unit 80 via controlling the first charging switch unit 40 and the second charging switch unit 70 simultaneously (S40). Thus, it is allowed to charge two batteries at the same time and improve the battery charging efficiency.

In addition, the charging apparatus and method are used in hot pluggable manner. For example, when battery capacity of the first battery unit 50 is going flat, a user installs the second battery unit 80 without turning down the laptop computer, the micro controller unit 20 controls the second battery unit 80 being discharged to the system main power unit 30 the first discharging switch unit 60 and the second discharging switch unit 90 and the first battery unit 50 is allowed to be attached. When there is only the second battery unit 80 installed in a laptop computer, the first battery unit 50 is installed to the notebook without turning down the laptop computer. At this point, the laptop computer is still powered by the second battery unit 80 until the battery capacity of the second battery unit 80 is flat. When the battery capacity of the second battery unit 80 is flat, the micro controller unit 20 controls the first battery unit 50 being discharged to the system main power unit 30 via controlling the first discharging switch unit 60 and the second discharging switch unit 90.

As the skilled person will appreciate, various changes and modifications can be made to the described embodiments. It is intended to include all such variations, modifications and equivalents which fall within the scope of the invention, as defined in the accompanying claims.

What is claimed is:

1. A charging apparatus for laptop computer with multi-battery, the charging apparatus used for a first battery unit and a second battery unit and comprising:
    a micro controller unit;
    a first charging switch unit electrically connected to the micro controller unit, which further comprises:
        a first charging switch subunit electrically connected to the charging unit;
        a second charging switch subunit electrically connected to the first charging switch subunit and the micro controller unit;
        a third charging switch subunit electrically connected to the first charging switch subunit and the first battery unit;
        a fourth charging switch subunit electrically connected to the third charging switch subunit and the micro controller unit,
        a first charging diode electrically connected to the first charging switch subunit;
        a second charging diode electrically connected to the third charging switch subunit;
        a first charging resistor electrically connected to the first charging switch subunit; and
        a second charging resistor electrically connected to the third charging switch subunit;
    a second charging switch unit electrically connected to the micro controller unit, which further comprises:
        a fifth charging switch subunit electrically connected to the charging unit;
        a sixth charging switch subunit electrically connected to the fifth charging switch subunit and the micro controller unit;
        a seventh charging switch subunit electrically connected to the fifth charging switch subunit and the second battery unit; and
        an eighth charging switch subunit electrically connected to the seventh charging switch subunit and the micro controller unit;
        a third charging diode electrically connected to the fifth charging switch subunit;
        a fourth charging diode electrically connected to the seventh charging switch subunit;
        a third charging resistor electrically connected to the fifth charging switch subunit;
        a fourth charging resistor electrically connected to the seventh charging switch subunit;
        a first charging capacitor electrically connected to the fifth charging switch subunit; and
        a second charging capacitor electrically connected to the fifth charging switch subunit;
    a first discharging switch unit electrically connected to the micro controller unit;
    a second discharging switch unit electrically connected to the micro controller unit;
    a charging unit electrically connected to the first charging switch unit and the second charging switch unit; and
    a system main power unit electrically connected to the first discharging switch unit and the second discharging switch unit,
    wherein, the micro controller unit controls the charging unit charging the first battery unit and the second battery unit via controlling the first charging switch unit and the second charging switch unit,
    wherein the micro controller unit controls the first battery unit and the second battery unit to discharge to the system main power unit via controlling the first discharging switch unit and the second discharging switch unit.

2. The charging apparatus of claim 1, wherein the first charging switch subunit is a P-TYPE Metal Oxide Semiconductor Field Effect Transistor (MOSFET); the second charging switch subunit is a N-TYPE MOSFET; the third charging switch subunit is a P-TYPE MOSFET; the fourth charging switch subunit is a N-TYPE MOSFET; the fifth charging switch subunit is a P-TYPE MOSFET; the sixth charging switch subunit is a N-TYPE MOSFET; the seventh charging switch subunit is a P-TYPE MOSFET; the eighth charging switch subunit is a N-TYPE MOSFET.

3. The charging apparatus of claim 2, wherein the first discharging switch unit further comprises:
    a first discharging switch subunit electrically connected to the first battery unit;
    a second discharging switch subunit electrically connected to the first discharging switch subunit and the micro controller unit;
    a third discharging switch subunit electrically connected to the first discharging switch subunit and the system main power unit; and
    a fourth discharging switch subunit electrically connected to the third discharging switch subunit and the micro controller unit,
    the second discharging switch unit further comprising:
    a fifth discharging switch subunit electrically connected to the second battery unit;
    a sixth discharging switch subunit electrically connected to the fifth discharging switch subunit and the micro controller unit;
    a seventh discharging switch subunit electrically connected to the fifth discharging switch subunit and the system main power unit; and
    an eighth discharging switch subunit electrically connected to the seventh discharging switch subunit and the micro controller unit.

4. The charging apparatus of claim 3, wherein the first discharging switch unit further comprises:
    a first discharging diode electrically connected to the first discharging switch subunit;
    a second discharging diode electrically connected to the third discharging switch subunit;
    a first discharging resistor electrically connected to the first discharging switch subunit; and
    a second discharging resistor electrically connected to the third discharging switch subunit,
    the second discharging switch unit further comprises:
    a third discharging diode electrically connected to the fifth discharging switch subunit;
    a fourth discharging diode electrically connected to the seventh discharging switch subunit;
    a third discharging resistor electrically connected to the fifth discharging switch subunit;
    a fourth discharging resistor electrically connected to the seventh discharging switch subunit;
    a first discharging capacitor electrically connected to the seventh discharging switch subunit; and a second discharging capacitor electrically connected to the seventh discharging switch subunit.

5. The charging apparatus of claim 4, wherein the first discharging switch subunit is a P-TYPE MOSFET; the second discharging switch subunit is a N-TYPE MOSFET; the third discharging switch subunit is a P-TYPE MOSFET; the fourth discharging switch subunit is a N-TYPE MOSFET; the fifth discharging switch subunit is a P-TYPE MOSFET; the sixth discharging switch subunit is a N-TYPE MOSFET; the seventh discharging switch subunit is a P-TYPE MOSFET; the eighth discharging switch subunit is a N-TYPE MOSFET.

* * * * *